United States Patent
Preheim et al.

(10) Patent No.: US 10,368,538 B2
(45) Date of Patent: *Aug. 6, 2019

(54) NOZZLE CONTROL SYSTEM AND METHOD

(71) Applicant: Raven Industries, Inc., Sioux Falls, SD (US)

(72) Inventors: John D. Preheim, Beresford, SD (US); Brent A. Driesen, Alvord, IA (US); Jared Ernest Kocer, Sioux Falls, SD (US)

(73) Assignee: Raven Industries, Inc., Sioux Falls, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/703,818

(22) Filed: Sep. 13, 2017

(65) Prior Publication Data

US 2018/0042214 A1 Feb. 15, 2018

Related U.S. Application Data

(63) Continuation of application No. 15/029,935, filed as application No. PCT/US2014/061150 on Oct. 17, 2014, now Pat. No. 9,781,916.

(Continued)

(51) Int. Cl.
  *A01M 7/00* (2006.01)
  *B05B 12/08* (2006.01)
(52) U.S. Cl.
  CPC .......... *A01M 7/0089* (2013.01); *B05B 12/08* (2013.01)
(58) Field of Classification Search
  CPC ....... A01M 7/0089; A01M 7/00; B05B 12/08; B05B 12/00
  See application file for complete search history.

(56) References Cited

U.S. PATENT DOCUMENTS

| 3,197,299 | A | 7/1965 | Bosse et al. |
| 3,955,795 | A | 5/1976 | Neely |

(Continued)

FOREIGN PATENT DOCUMENTS

| AU | 2006202376 B2 | 12/2006 |
| AU | 2009203181 A1 | 2/2010 |

(Continued)

OTHER PUBLICATIONS

"U.S. Appl. No. 15/029,935, Final Office Action dated Jul. 11, 2017", 6 pgs.

(Continued)

*Primary Examiner* — Christopher J. Novosad
(74) *Attorney, Agent, or Firm* — Schwegman Lundberg & Woessner, P.A.

(57) ABSTRACT

A system and method for nozzle control includes an overall system pressure valve, configured to adjust the pressure of an agricultural product within a boom. A master node is configured to receive an overall system flow rate measurement, an overall target flow rate, and an overall system pressure measurement, the master node configured to adjust the overall system pressure valve to control the pressure of the agricultural product. A plurality of smart nozzles are configured to dispense the agricultural product, the plurality of smart nozzles each associated with an electronic control unit (ECU) and one or more individual nozzle, the smart nozzle is configured to control a nozzle flow rate of the associated one or more individual nozzles.

18 Claims, 6 Drawing Sheets

Related U.S. Application Data

(60) Provisional application No. 61/892,339, filed on Oct. 17, 2013.

(56) References Cited

U.S. PATENT DOCUMENTS

| | | |
|---|---|---|
| 4,530,463 A | 7/1985 | Hiniker et al. |
| 4,582,085 A | 4/1986 | Hafner et al. |
| 4,803,626 A | 2/1989 | Bachman et al. |
| 5,285,814 A | 2/1994 | Pettersson et al. |
| 5,337,959 A | 8/1994 | Boyd |
| 5,475,614 A | 12/1995 | Tofte et al. |
| 5,479,812 A | 1/1996 | Juntunen et al. |
| 5,653,389 A | 8/1997 | Henderson et al. |
| 5,704,546 A | 1/1998 | Henderson et al. |
| 5,772,114 A | 6/1998 | Hunter |
| 5,884,224 A | 3/1999 | McNabb et al. |
| 5,913,915 A | 6/1999 | McQuinn |
| 5,919,242 A | 7/1999 | Greatline et al. |
| 5,941,303 A | 8/1999 | Gowan et al. |
| 5,971,294 A | 10/1999 | Thompson et al. |
| 5,978,723 A | 11/1999 | Hale et al. |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,112,999 A | 9/2000 | Fingleton et al. |
| 6,122,581 A | 9/2000 | McQuinn |
| 6,149,071 A | 11/2000 | Maccallummhor et al. |
| 6,189,807 B1 | 2/2001 | Miller et al. |
| 6,199,000 B1 | 3/2001 | Keller et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,522,948 B1 | 2/2003 | Benneweis |
| 6,598,944 B1 | 7/2003 | Wolff et al. |
| 6,606,542 B2 | 8/2003 | Hauwiller et al. |
| 6,678,580 B2 | 1/2004 | Benneweis |
| 6,698,368 B2 | 3/2004 | Cresswell |
| 6,708,080 B2 | 3/2004 | Benneweis |
| 6,776,355 B2 | 8/2004 | Ringer et al. |
| 6,877,675 B2 | 4/2005 | Benneweis |
| 7,124,964 B2 | 10/2006 | Bui |
| 7,243,899 B2 | 7/2007 | Acar et al. |
| 7,395,769 B2 | 7/2008 | Jensen |
| 7,626,288 B2 | 12/2009 | Protze |
| 7,690,440 B2 | 4/2010 | Dean et al. |
| 7,694,638 B1 | 4/2010 | Riewerts et al. |
| 7,706,926 B2 | 4/2010 | Peterson |
| 7,848,865 B2 | 12/2010 | Di Federico et al. |
| 8,141,504 B2 | 3/2012 | Dean et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,488,874 B2 | 7/2013 | Zaman et al. |
| 8,523,085 B2 | 9/2013 | Grimm et al. |
| 8,634,993 B2 | 1/2014 | McClure |
| 8,635,963 B2 | 1/2014 | Friggstad |
| 8,844,838 B2 | 9/2014 | Funseth et al. |
| 8,919,676 B2 | 12/2014 | Funseth et al. |
| 9,073,070 B2 | 7/2015 | Funseth et al. |
| 9,266,124 B2 | 2/2016 | Humpal |
| 9,781,916 B2 | 10/2017 | Preheim et al. |
| 10,173,236 B2 | 1/2019 | Preheim et al. |
| 2002/0030119 A1 | 3/2002 | Proharam |
| 2002/0107609 A1 | 8/2002 | Benneweis |
| 2003/0070597 A1 | 4/2003 | Cresswell |
| 2004/0036048 A1 | 2/2004 | Petersen |
| 2004/0104370 A1 | 6/2004 | Suzuki |
| 2005/0048196 A1 | 3/2005 | Yanagita et al. |
| 2005/0125083 A1 | 6/2005 | Kiko |
| 2006/0237562 A1 | 10/2006 | Hedegard |
| 2006/0273189 A1 | 12/2006 | Grimm et al. |
| 2008/0114497 A1 | 5/2008 | Giles et al. |
| 2008/0283633 A1 | 11/2008 | Nozaki et al. |
| 2008/0296398 A1 | 12/2008 | Hickman et al. |
| 2009/0112372 A1 | 4/2009 | Peterson |
| 2009/0134237 A1 | 5/2009 | Giles |
| 2009/0184182 A1 | 7/2009 | Beeren |
| 2010/0032492 A1 | 2/2010 | Grimm et al. |
| 2010/0101469 A1 | 4/2010 | Landphair et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2012/0045013 A1 | 2/2012 | Chen et al. |
| 2012/0080624 A1 | 4/2012 | Stahr et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0271467 A1 | 10/2012 | Grimm et al. |
| 2013/0092746 A1 | 4/2013 | Scott et al. |
| 2013/0292590 A1 | 11/2013 | Stahr |
| 2013/0320106 A1 | 12/2013 | Schmidt |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0361094 A1 | 12/2014 | Michael |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0044862 A1 | 2/2016 | Kocer et al. |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2017/0079200 A1 | 3/2017 | Posselius et al. |
| 2017/0314580 A1 | 11/2017 | Steensma et al. |
| 2017/0348718 A1 | 12/2017 | Preheim et al. |
| 2019/0029170 A1 | 1/2019 | Wilger |

FOREIGN PATENT DOCUMENTS

| | | |
|---|---|---|
| AU | 2012201357 A1 | 9/2012 |
| AU | 2013203361 A1 | 10/2013 |
| AU | 2013204455 A1 | 3/2014 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CN | 202255911 U | 5/2012 |
| CN | 102266829 B | 12/2012 |
| CN | 203264929 U | 11/2013 |
| EP | 0963255 B1 | 10/2002 |
| EP | 0847307 B2 | 1/2003 |
| GB | 2322573 A | 9/1998 |
| JP | 2000139245 A | 5/2000 |
| JP | 2005-161221 A | 6/2005 |
| WO | WO-9712688 A1 | 4/1997 |
| WO | WO-2014210043 A1 | 12/2014 |
| WO | WO-2015058091 A1 | 4/2015 |
| WO | WO-2017124175 A1 | 7/2017 |
| WO | WO-2017192625 A1 | 11/2017 |
| WO | WO-2017223252 A1 | 12/2017 |
| WO | WO-2018129323 A1 | 7/2018 |
| WO | WO-2018129376 A2 | 7/2018 |
| WO | WO-2018129376 A3 | 7/2018 |

OTHER PUBLICATIONS

"U.S. Appl. No. 15/029,935, Non Final Office Action dated Mar. 30, 2017", 21 pgs.

"U.S. Appl. No. 15/029,935, Notice of Allowance dated Aug. 29, 2017", 5 pgs.

"U.S. Appl. No. 15/029,935, Preliminary Amendment filed Apr. 15, 2016", 3 pgs.

(56) References Cited

OTHER PUBLICATIONS

"U.S. Appl. No. 15/029,935, Reponse filed Aug. 16, 2017 to Final Office Action dated 07-11-7", 11 pgs.
"U.S. Appl. No. 15/029,935, Response filed Jun. 15, 2017 to Non Final Office Action dated Mar. 30, 2017", 12 pgs.
"Application Serial No. PCT/US2014/061150, International Preliminary Report on Patentability dated Oct. 16, 2015", 10 pgs.
"International Application Serial No. PCT/US2014/061150, International Search Report dated Feb. 4, 2015", 2 pgs.
"International Application Serial No. PCT/US2014/061150, Written Opinion dated Feb. 4, 2015", 7 pgs.
"Canadian Application Serial No. 2,926,448, Office Action dated Jan. 5, 2018", 5 pgs.
"U.S. Appl. No. 14/899,946, Final Office Action dated Dec. 28, 2018", 41 pgs.
"U.S. Appl. No. 14/899,946, Non Final Office Action dated Mar. 26, 2018", 37 pgs.
"U.S. Appl. No. 14/899,946, Response filed Aug. 27, 2018 to Non Final Office Action dated Mar. 26, 2018", 27 pgs.
"U.S. Appl. No. 15/629,696, Corrected Notice of Allowability dated Aug. 29, 2018", 4 pgs.
"U.S. Appl. No. 15/629,696, Corrected Notice of Allowability dated Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response to Examiner's Reasons for Allowance filed Nov. 13, 2018", 2 pgs.
"U.S. Appl. No. 15/629,696, Notice of Allowance dated Aug. 13, 2018", 5 pgs.
"Brazil Application Serial No. 1120160085175, Office Action dated Nov. 6, 2018".
"Canadian Application Serial No. 2,926,448, Examiners Rule 30(2) Requisition dated Oct. 3, 2018", 3 pgs.
"Canadian Application Serial No. 2,926,448, Response filed Jun. 26, 2018 to Office Action dated Jan. 5, 2018", 19 pgs.
"International Application Serial No. PCT/US2014/043926, International Preliminary Report on Patentability dated Jan. 7, 2016", 11 pgs.
"International Application Serial No. PCT/US2014/043926, International Search Report dated Nov. 3, 2014", 2 pgs.
"International Application Serial No. PCT/US2014/043926, Written Opinion dated Nov. 3, 2014", 9 pgs.
"International Application Serial No. PCT/US2017/030694, International Preliminary Report on Patentability dated May 29, 2018", 23 pgs.
"International Application Serial No. PCT/US2017/030694, Response filed Mar. 2, 2018 to Written Opinion dated Aug. 1, 2017", 4 pgs.
"International Application Serial No. PCT/US2017/038622, International Search Report dated Sep. 28, 2017", 2 pgs.
"International Application Serial No. PCT/US2017/038622, Written Opinion dated Sep. 28, 2017", 5 pgs.
"International Application Serial No. PCT/US2018/012590, International Search Report dated Apr. 13, 2018", 4 pgs.
"International Application Serial No. PCT/US2018/012590, Invitation to Pay Additional Fees and Partial Search Report dated Feb. 21, 2018", 2 pgs.
"International Application Serial No. PCT/US2018/012590, Written Opinion dated Apr. 13, 2018", 13 pgs.
"International Application Serial No. PCT/US2018/012661, International Search Report dated Jun. 21, 2018", 4 pgs.
"International Application Serial No. PCT/US2018/012661, Invitation to Pay Additional Fees and Partial Search Report dated Mar. 15, 2018", 2 pgs.
"International Application Serial No. PCT/US2018/012661, Written Opinion dated Jun. 21, 2018", 9 pgs.
"Australian Application Serial No. 2017285727, First Examination Report dated May 21, 2019", 2 pgs.
"Canadian Application Serial No, 2,926,448, Response filed Mar. 19, 2019 to Examiner's Rule 30(2) Requisition dated Oct. 3, 2018", 7 pgs.

NOZZLE CONTROL SYSTEM AND METHOD

CLAIM OF PRIORITY

This patent application is a continuation of U.S. patent application Ser. No. 15/029,935, filed Apr. 15, 2016, which is a U.S. National Stage Filing under 35 U.S.C. 371 from International Application No. PCT/US2014/061150, filed Oct. 17, 2014, and published as WO 2015/058091 on Apr. 23, 2015, which claims the benefit of priority of U.S. Provisional Patent Application Ser. No. 61/892,339, filed on Oct. 17, 2013, which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries; Sioux Falls, S. Dak.; All Rights Reserved.

TECHNICAL FIELD

This document pertains generally, but not by way of limitation, to a nozzle control system and method for the application of products (granular, fluid, or gaseous) to crops or a field.

BACKGROUND

Agricultural sprayers are used to distribute agricultural products, such as fertilizers, insecticides, herbicides and fungicides, to a field or crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds, or streams. Irregular shapes and contour changes can provide challenges in even distribution of agricultural products and can lead to waste of the agricultural product. Additionally, the configuration of the agricultural sprayer itself may cause unpredictable variation in application of the agricultural product.

Agricultural sprayers include a reservoir for a carrier substance. The reservoir is in communication, by way of a header tube, or pipe, with a plurality of sections provided along one or more carrier booms (e.g., boom tubes along the booms). The header is the main line extending between the reservoir and the carrier booms. Each of the plurality of sections includes multiple sprayer nozzles that distribute the carrier substance received by the section. The carrier substance includes the carrier substance, such as water, and, in one example, agricultural products dispersed into the carrier substance, for instance herbicides, pesticides, fertilizers, or the like.

OVERVIEW

The present inventors have recognized, among other things, that a problem to be solved can include controlling dispersion of an agricultural product, such as from an agricultural sprayer boom. In an example, the present subject matter can provide a solution to this problem, such as by providing a nozzle control system and method capable of determining a nozzle specific flow rate for each nozzle on the boom and controlling the flow rate for each nozzle on the boom. Such a system includes an electronic control unit at each nozzle configured to receive and manipulate a number of inputs, such as nozzle position on a boom, length of the boom, nozzle spacing, yaw rate of the boom, target nozzle flow rate for the system, yaw rate of the agricultural sprayer, speed of the agricultural sprayer, the overall system pressure, agricultural product characteristics. That is, the present subject matter can provide a solution to the above problem by controlling the flow rate at each nozzle to provide a uniform distribution of agricultural product over a field.

The present inventors have recognized, among other things, that a problem to be solved can include controlling dispersion of an agricultural product, such as from an agricultural sprayer boom, according to field or crop specific characteristics. In an example, the present subject matter can provide a solution to this problem, such as by providing a nozzle control system and method including one or more location fiducials associated with the system, the one or more location fiducials configured to mark the location of one or more nozzles of the plurality of nozzles on a field map. Further, each of the nozzles of the plurality of nozzles of the system is configured to dispense the agricultural product at individual rates according to the location the one or more nozzles of the plurality of nozzles on the field map.

The present inventors have recognized, among other things, that a problem to be solved can include boom, row, or section control of an agricultural delivery system. In an example, the present subject matter can provide a solution to this problem, such as by providing greater control to individual sections or rows of an agricultural product delivery system by a control method and system for delivering an agricultural product configured through flow rate control of the agricultural product at each individual nozzle or nozzle group of the agricultural delivery system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

The drawings illustrate generally, by way of example, but not by way of limitation, various embodiments discussed in the present document.

DETAILED DESCRIPTION

Figure 1:
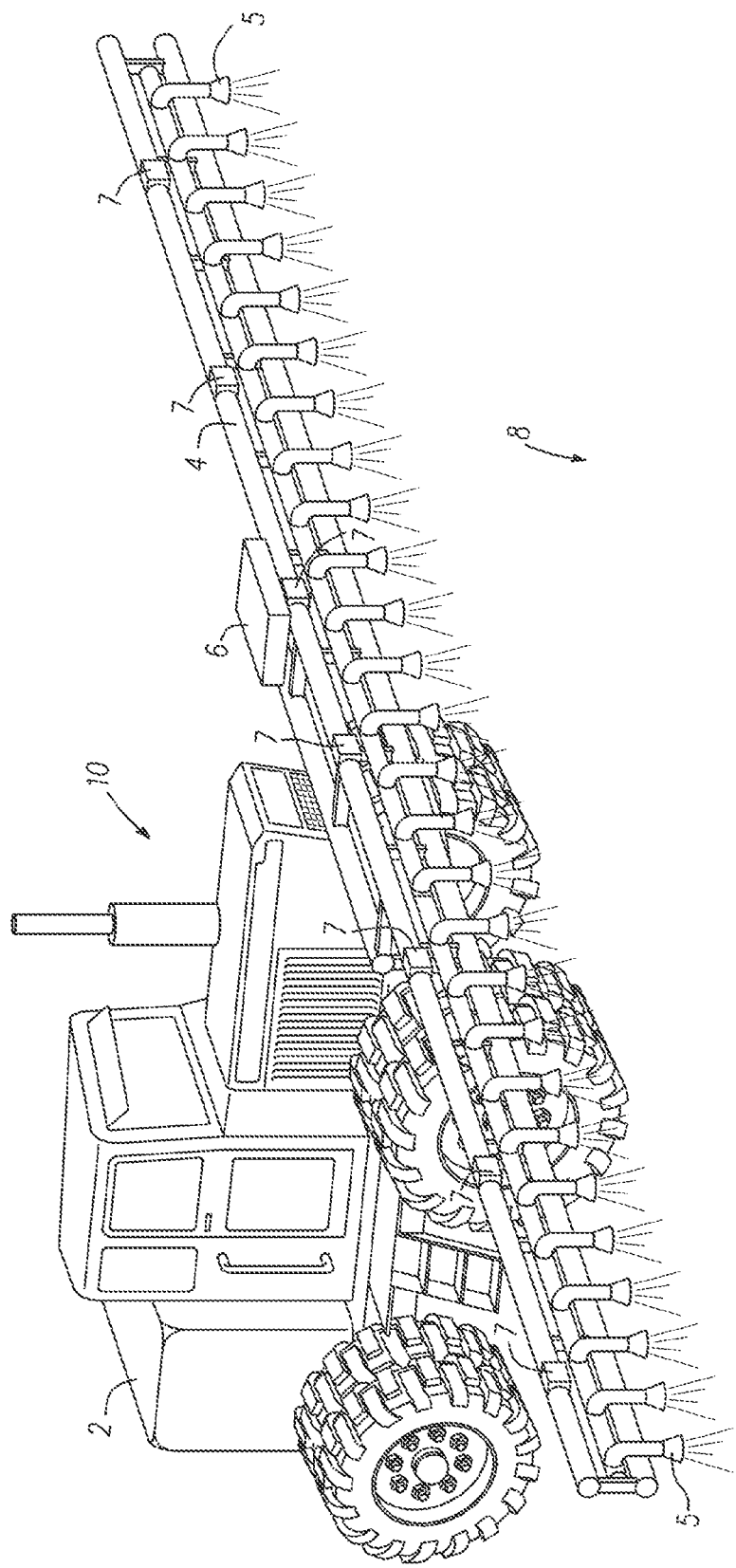
FIG. 1 is a perspective view of one example of an agricultural sprayer.

As illustrated in FIG. 1, an agricultural sprayer 10 includes a reservoir tank 2, one or more sprayer booms 4, including one or more nozzles 5, one or more electronic control units (ECU) 7 (e.g., a microprocessor based system), and a master node 6. (e.g., a microprocessor based system) In an example, the agricultural sprayer 10 includes an integral reservoir tank 2 or a tow behind reservoir tank. The reservoir tank 2, in an example, includes the agricultural product mixed with a carrier fluid, such as water, or the carrier fluid and the agricultural product are mixed in-line prior to or at the sprayer boom 4. The nozzles 5 are positioned along the sprayer boom 4 to deliver the agricultural product to a crop or an agricultural field 8. Crops include, but are not limited to, any product grown in an agricultural field, such as row and non-row based crops. Agricultural products include, but are not limited to, fertilizers, water, pesticides, fungicides, herbicides, or the like. As shown, the agricultural sprayer 10 includes master node 6, as described herein. The master node 6, as will be discussed herein, operates in conjunction with the one or more ECU 7 to control delivery of the agricultural product from the reservoir tank 2, to the sprayer boom 4 and the associated nozzles 5 for delivery to the agricultural field or crop.

Figure 2:
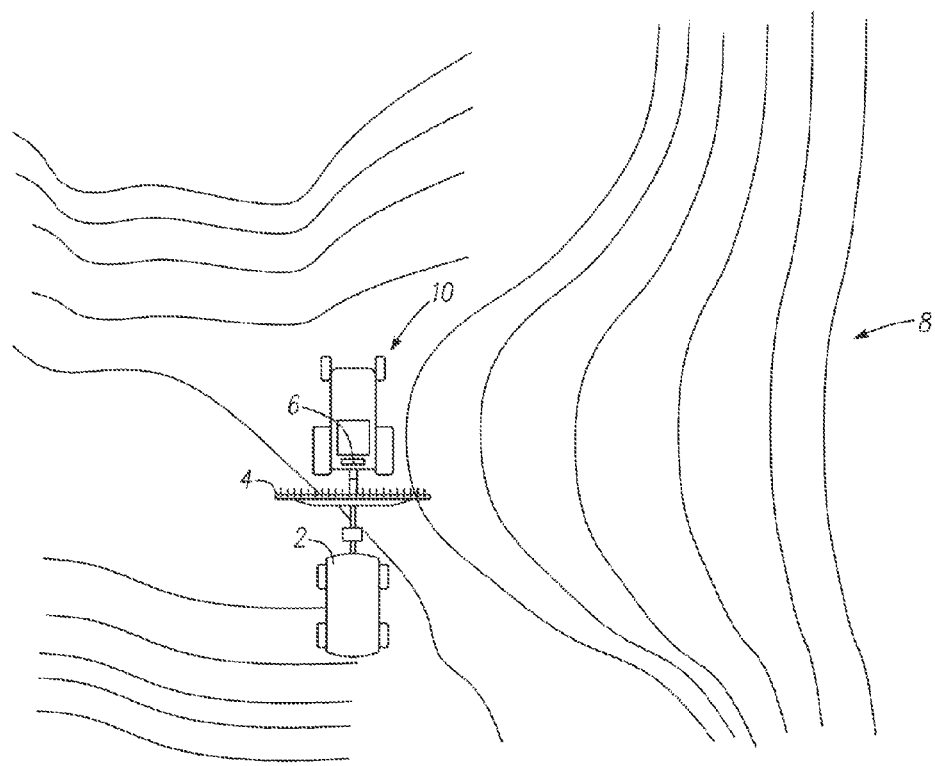
FIG. 2 is a top view of one example of an agricultural sprayer and an agricultural field.

As illustrated in FIG. 2, an example of an agricultural sprayer 10 is provided in an agricultural field 8 and delivering an agricultural product. The agricultural sprayer 10 includes a tow behind reservoir tank 2, one or more sprayer booms 4 (e.g., dual booms extending from the center of the sprayer 10), and the master node 6. As described herein, the controller 6 controls delivery of the agricultural product to the agricultural field 8 or crops.

Figure 3:
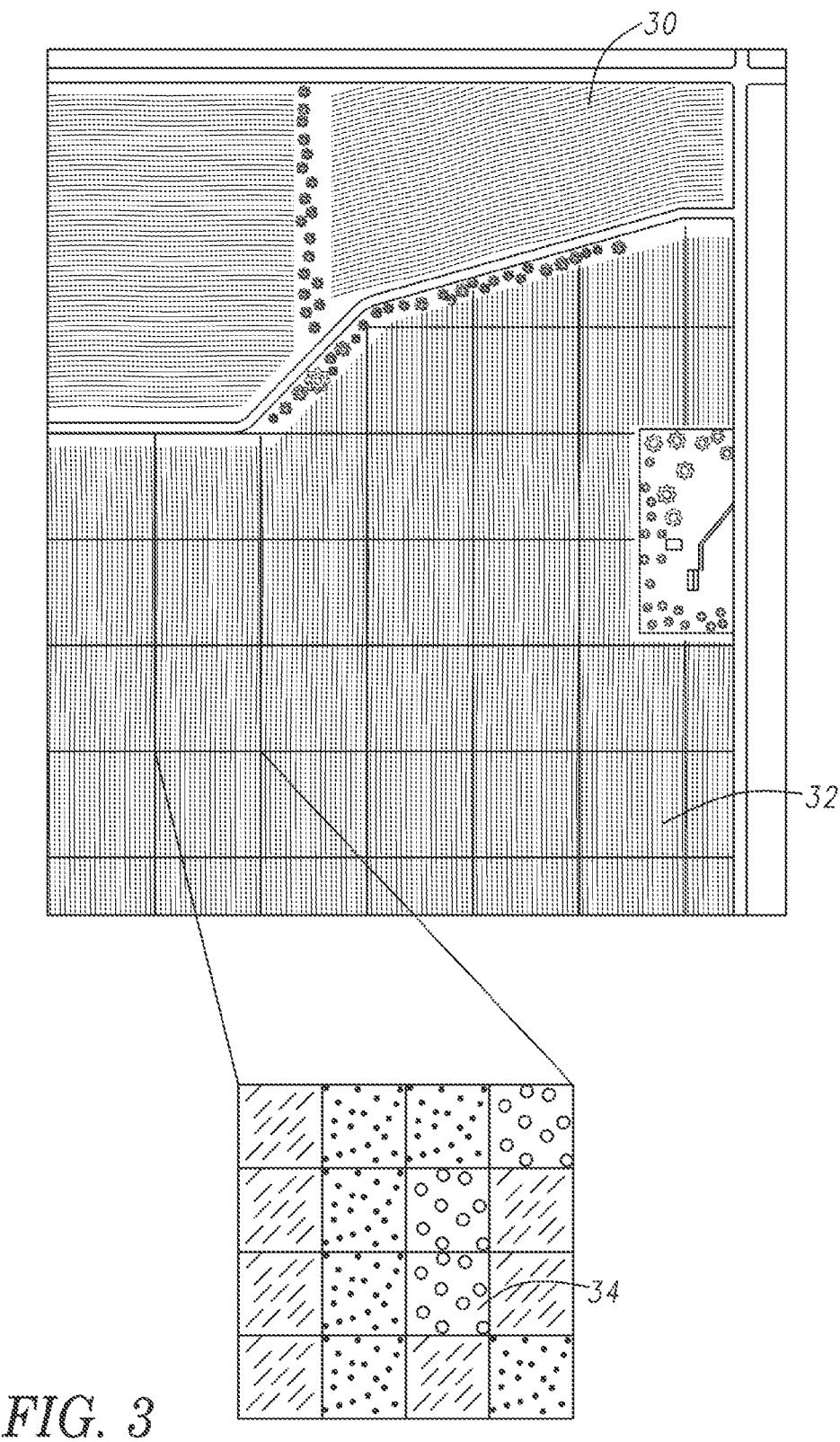
FIG. 3 is one example of a field moisture content map including crop moisture content values associated with corresponding field locations.

FIG. 3 is a demonstrative example of a field map 30. Optionally the yield map 30 includes but is not limited to providing a visual representation of agricultural product delivery instructions, such as, but not limited to, a soil characteristic, crop yield, agricultural product instructions, or any combination thereof. A zoomed in portion of the field map 30 is shown in the bottom view of FIG. 3. As shown by way of varying stippling, shading, or the like a plurality of zones 32 accordingly has corresponding agricultural product delivery instructions (e.g., agricultural product type or flow rate, etc.), magnitude of the comparison, or type of calibration instruction. For instance, as shown in FIG. 3, a plurality of zones 32 having a varying agricultural product delivery instructions are associated with the one or more zones 32. Accordingly each of the zones 32 includes in one example an array of information including the agricultural product delivery instructions. The field map 30 accordingly provides a representation to the operator of the agricultural product delivery demands during an agricultural product delivery operation. Information provided by the field map 30 is optionally used for instance to determine better husbandry techniques, planting strategies and the like for the field in the next season.

Referring again to FIG. 3, the plurality of zones 32 include sub-zones 34. As shown, each of the zones and sub-zones has different stippling, shading or the like associated with the true harvested crop characteristic. Optionally the sub-zones 34 (or any of the plurality of zones 32) have varying stippling, shading or coloring techniques or any combination thereof to accordingly provide indications of calibration instructions, magnitude of comparisons, or both. As shown in FIG. 3, by way of the stippling, shading, coloring or the like the agricultural product delivery instructions vary between each of the zones 32. As shown for instance, each of the sub-zones 34 the stippling is different between the zones thereby indicating agricultural product delivery instructions, such as agricultural product type, there between varies. Optionally the field map 30 provides one or more interactive zones 32. For instance the user is able to zoom in and examine each of the zones 32 accordingly allowing for instance through a graphical user interface interaction with the field map 30 to accordingly determine the agricultural product delivery instructions of one or a plurality of the zones 32.

Figure 4:
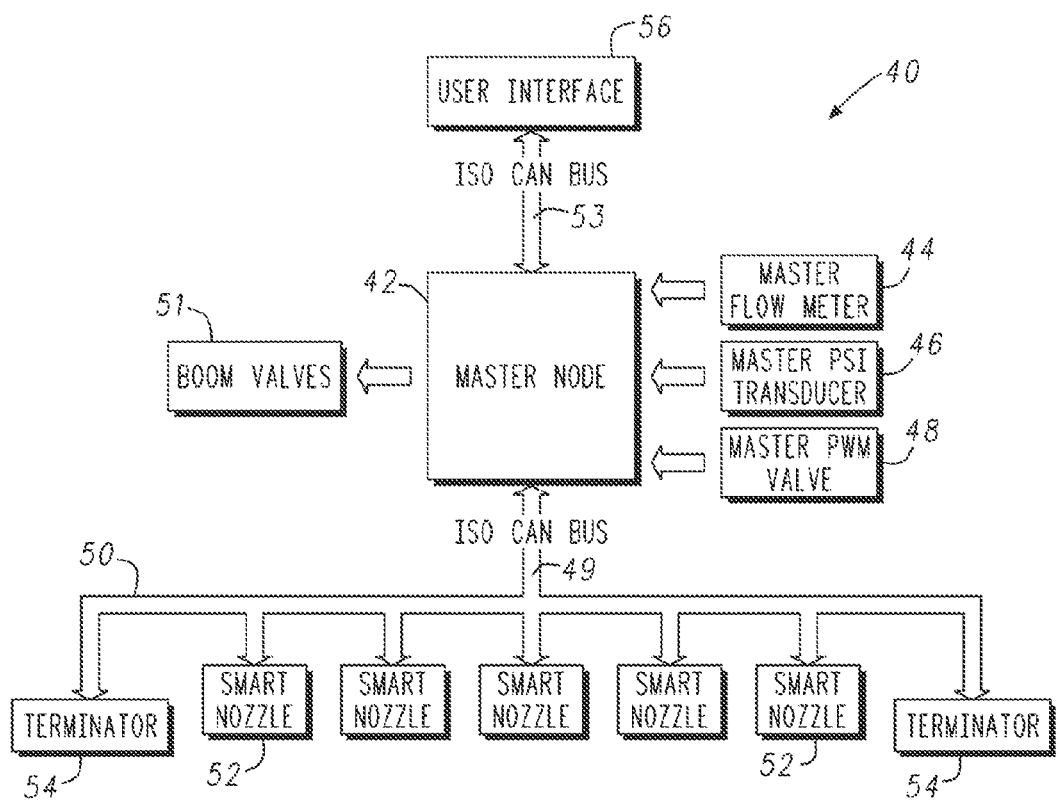
FIG. 4 is an exemplary schematic view of an overall nozzle control system.

FIG. 4 illustrates a schematic of an exemplary overall nozzle control system 40, wherein one or more nozzles 52 located on a boom 50 are capable of controlling a respective nozzle flow rate of an agricultural product dispensed from the nozzle 52. As shown in FIG. 4, a master node 42 is further communicatively coupled to one or more valves of the boom 51, such that system pressure within the boom 50 can be controlled by the master node 42. However, unlike prior systems, the master node 42 of the current system is not configured to control the flow rate within the system 40, boom 50, or at the smart nozzles 52. The master node 42 includes inputs from a master flowmeter 44, a master pressure transducer 46, and a master pulse width modulation (PWM) valve 48. The master node controls 42 the master PWM valve 48 so as to maintain the targeted system pressure, such that a desired droplet size of the agricultural product is obtained out of the nozzles 52. For example, environmental conditions, such as wind, humidity, rain, or temperature, field characteristics, or user preference determine whether a smaller or larger droplet size of the agricultural product is preferred. By maintaining a constant system pressure, the preferred droplet size can be obtained and maintained by the current system.

Figure 5:
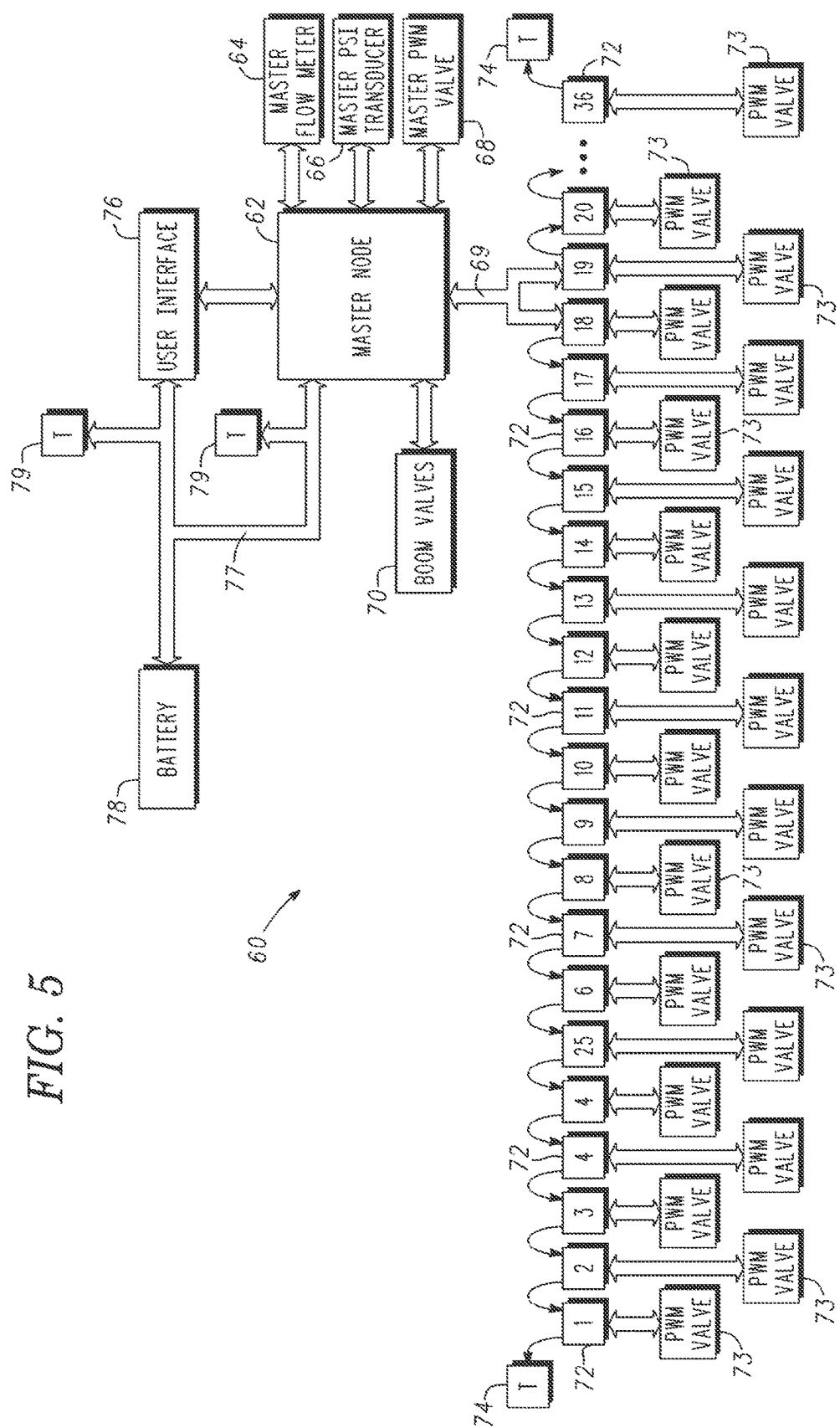
FIG. 5 is a detailed schematic view of an exemplary nozzle control system.

In the exemplary embodiment, each of the nozzles 52 is a smart nozzle that includes an electronic control unit (ECU) that regulates, determines, and/or controls the nozzle flow rate of the agricultural product dispensed from the nozzle 52, as discussed in reference to FIG. 5. In other embodiments, a group of nozzles 52 are associated with a common ECU and as a group be considered a single smart nozzle. The smart nozzles 52 are connected to a boom 50 and communicatively coupled to a controller area network 49 (e.g., ISO CAN bus) of the overall control system 40. As discussed herein, the CAN bus 49 is configured to provide overall system information from the master node 42 (e.g., master node). The ECU at each smart nozzle 52 uses data from the overall system information to regulate, determine, and/or control the nozzle flow rate of each corresponding smart nozzle 52.

The master node 42 controls a system pressure using, for example, the master PSI transducer 46 and the master pulse width modulation (PWM) valve 48, instead of controlling a system flow rate. Although FIG. 4 illustrates a PWM valve as the master valve 48, embodiments are not so limited. For example, the master valve 48 includes any valve capable of controlling pressure of a system, such as, for example, a ball valve, a PWM valve, or a butterfly valve. For instance, the master node 42 maintains the system pressure at a target system value in contrast to affirmatively controlling the agricultural product flow rate, and the flow rate is controlled at each smart nozzle 52. In another example, the master node controls the system pressure to one or more target values and the smart nozzles 52 control the flow rate at each of the smart nozzles 52 and, therefore, the overall agricultural product flow rate of the system.

In an example, the target system pressure is provided by a user, such as at the User Interface 56 (UI) connected to the master node 42 by the ISO CAN bus 53. In an additional example, the user also provides a target system flow rate (e.g., volume/area) at the UI. In an example, the master node 42 provides the target system flow rate to each of the one or more smart nozzle 52, such that each smart nozzle 52 (or each ECU, as discussed herein) determines an individual agricultural product flow rate for the smart nozzle 52. For example, the system target flow rate is divided by the number of nozzles to provide 52 a target agricultural product flow rate for each of the one or more nozzles 52. In an example, the master node measures the flow rate (e.g., volume per time) with a master flow meter 44 and compares it with the overall target flow rate (e.g., designated by one or more of the user, crop type, soil characteristic, agricultural product type, historical data, or the like). The master node 42 is configured to determine a difference or error, if present, between the measured system flow rate and the target system flow rate. In such an example, the master node 42 provides the determined difference, by the ISO CAN bus 53, to the individual nozzles 52 (or ECUs, as discussed herein). The one or more nozzles 52 receive the difference on the CAN bus 53 and adjust their pressure/flow/duty cycle curve using the difference (e.g., compensating for errors in the system) to reduce the error between the measured and target system flow rates.

Additionally, in at least some examples, the master node 42 reports the actual pressure, measured by the master PSI transducer 46, as well as boom 50 information, including, but not limited to, one or more of yaw rate, speed, number of smart nozzles of the boom, distance between smart nozzles on the boom, to the smart nozzles 52 (or ECUs, as described herein) for individual flow rate control of each of the smart nozzles 52. For example, the information provided from the master node 42 is used in addition to nozzle characteristics to control the individual flow rate control of each smart nozzle 52. Nozzle characteristics include, but are not limited to nozzle position on a boom, length of the boom, nozzle spacing, target flow rate for the system, yaw rate of the boom, yaw rate of the agricultural sprayer, speed of the agricultural sprayer, the overall system pressure, agricultural product characteristics. The system 40 is configured to be installed on an agricultural sprayer, and as such, since the sprayer moves during operation (translates and rotates), the one or more nozzle characteristics, in an example, are dynamic and accordingly changes the individual flow rate.

FIG. 5 illustrates a detailed schematic view of an exemplary nozzle control system 60. The control system 60 includes a master node 62 communicatively coupled to one or more valves of the boom 70, such that system pressure within the boom can be controlled by the master node 62. Further, the master node 62 includes inputs from a master flowmeter 64, a master pressure transducer 66, and a master pulse width modulation (PWM) valve 68. Further, as described herein, the master node is coupled to a UI 76 and, in an example, a battery 78, so as to provide power to one or more of the master node 62 and UI 76.

As shown in the embodiment of FIG. 5, a smart nozzle includes an ECU 72 coupled to a PWM valve 73. That is, FIG. 5 illustrates 36 ECUs relating directly to 36 nozzles of the nozzle control system 60, but embodiments are not so limited. A master node 62 is communicatively coupled, by ISO CAN bus 69 to ECU-18 and ECU-19, wherein ECU-18 72 and ECU-19 72 define a center region of the boom. From the center region of the boom, the ECUs 72 are communicatively coupled to the most proximate ECU 72 in the direction toward each terminal end 74 of the boom. That is, ECU-18 is communicatively couple to ECU-17, which is communicatively coupled to ECU-16, and so forth until the terminator after ECU-1 is reached. The same pattern holds for the other half of the boom. Although 36 ECUs 72 are illustrated, embodiments are not so limited. Further, as shown in FIG. 5, each ECU 72 is coupled to one PWM valve 73, however, embodiments are not so limited. For example, a single ECU 72 is communicatively coupled to more than one PWM valve 73. Said another way, a single ECU 72, in an example, is communicatively coupled to more than one nozzle, such as, for example, every other nozzle. In an example, 12 ECUs split control of the 36 nozzles of the boom. In an example, a plurality of nozzles are partitioned into nozzle groups, such that each nozzle group includes an ECU 72 configured to control a nozzle group flow rate of the agricultural product dispensed from each nozzle of the nozzle group based on the nozzle characteristics, as described herein, of the respective nozzles. Benefits of such embodiments include reducing costs. Thus, a smart nozzle is a single nozzle and an associated ECU or is a group of nozzles associated with a common ECU.

In still another example, the system 60 includes one or more location fiducials associated with the system 60, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 72 of the system is configured to control the agricultural product at individual rates according to the location the one or more nozzles (or ECUs 72) of the plurality of nozzles on the field map (and optionally in addition to the nozzle characteristics described herein). Further, the each of the plurality of nozzles (or ECUs 72) can be cycled, such as on/off, according to the nozzle's (or nozzle group's or ECU's 72) location on the field. This is in contrast to previous approaches which required all the nozzles of a section of the boom to be shut off or turned on at the same time.

In an example, each nozzle ECU 72 is programmable to receive, track, or manipulate designated nozzle control factors. For example, each ECU 72 focuses on nozzle spacing, target flow rate for the system, and speed of the agricultural sprayer while ignoring yaw rate, nozzle location on the field, etc. Such examples provide the benefit of simplifying the system to user specifications, provide greater programmability of the system, and providing cost effective nozzle specific flow rate solutions. In yet another example, the ECUs 72 associated with each nozzle are instead consolidated into one or more centralized nodes that determine the individual flow rates of each of the respective nozzles in a similar manner to the previously described ECUs 72 associated with each of the nozzles.

Figure 6:
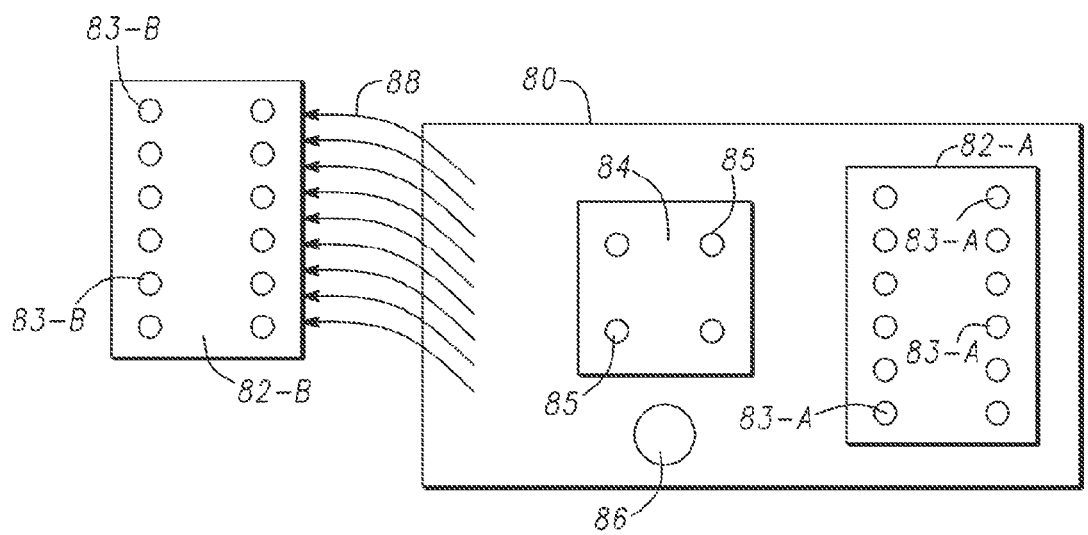
FIG. 6 is an exemplary schematic view of a nozzle ECU.

FIG. 6 is an exemplary schematic view of an ECU 80. The ECU 80 includes two connectors, including a 4-pin thermistor 84 and a 12-pin connector 82-A, and an LED 86. The LED 86, in an example, is indicates the readiness state of the smart nozzle. In an example, the LED 86 is a multi-color LED, wherein a specific color shown along with a rate at which the LED 86 flashes indicates if the smart nozzle is in an error mode, including what type of error, warning state, ready state, actively controlling state, or the like. The 4-pin thermistor 84 includes, in an example, a number of control aspects, such as, but not limited to, valve and thermistor. The 12-ping connector 82-A includes, in an example, a number of control aspects, such as but not limited to any specific configuration, power, ground, nozzle startup, location recognition. Such pin indexing, in an example, is applicable to a smart nozzle or the ISO CAN bus. The lines with arrows signify 88 a cable to daisy-chain ECU 82-A to a 12-pin connector 82-B including pins 83-B, although embodiments are not so limited. The ECU 80 controls the nozzle flow rate based on a number of parameters, including, but not limited to: speed of the sprayer or boom, yaw rate, target system flow rate (e.g. volume/area), and on/off command at runtime. Such parameters permits the ECU 80 to calibrate the duty cycle curve (e.g., the duty cycle curve provided by a nozzle manufacturer) of each smart nozzle needed to achieve the target nozzle flow rate of each of the smart nozzles. Each smart nozzle is further configured according to nozzle spacing on the boom, location on the boom, and nozzle type. Further, each smart nozzle can regulate or control the nozzle flow rate based on the location of the nozzle in the field (as described above).

In an example, the ECU 80 further includes the thermistor 84 so as to provide temperature sensitive control of the nozzle. For example, as power is provided to the thermistor 84, the thermistor 84 heats up, consequently changing the resistivity of the thermistor 84. The agricultural product flows over the thermistor 84, reducing the heat of the thermistor 84 and altering the resistivity of the thermistor 84. In an example, the changes in resistivity of the thermistor 84 are used to indicate or determine that a nozzle is fouled, clogged, or the like. In another example, a pressure sensor or transducer is configured to measure the pressure after each of the PWM valves (e.g., 73, FIG. 5). In an example the pressure transducer is attached to each smart nozzle or plugged as an add-on feature.

In a further example, the overall system data (e.g., actual flow rate compared to targeted flow rate, maintained pressure vs. targeted pressure, etc.) is used to calibrate one or more thermistors. The calibrated thermistor 84 of the smart nozzle is then used to further calibrate the duty cycle curve of the corresponding smart nozzle. Benefits of such examples, provide a more accurate, configurable, and efficient smart nozzle for application of an agricultural product.

Figure 7:
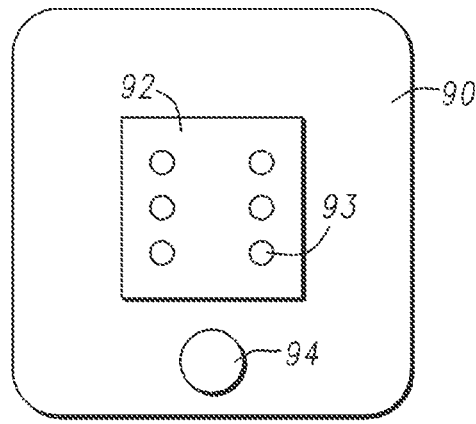
FIG. 7 is an alternative exemplary schematic view of a nozzle ECU.

FIG. 7 illustrates an alternative exemplary view of an ECU 90. The ECU 90 includes a 6-pin 93 connector 92 and an LED 94 on the circuit board. In such an example, each ECU 90 is wired to one another or wired to a centrally located hub. Although nozzle control systems and methods described herein and shown in FIGS. 1 and 2 reference a PWM master valve communicatively coupled to the master node, embodiments are not so limited. For example, other valves are contemplated. Further, examples herein are described in relation to an agricultural sprayer, but other embodiments, such as, but not limited to, planters or toolbars, are contemplated.

Figure 8:
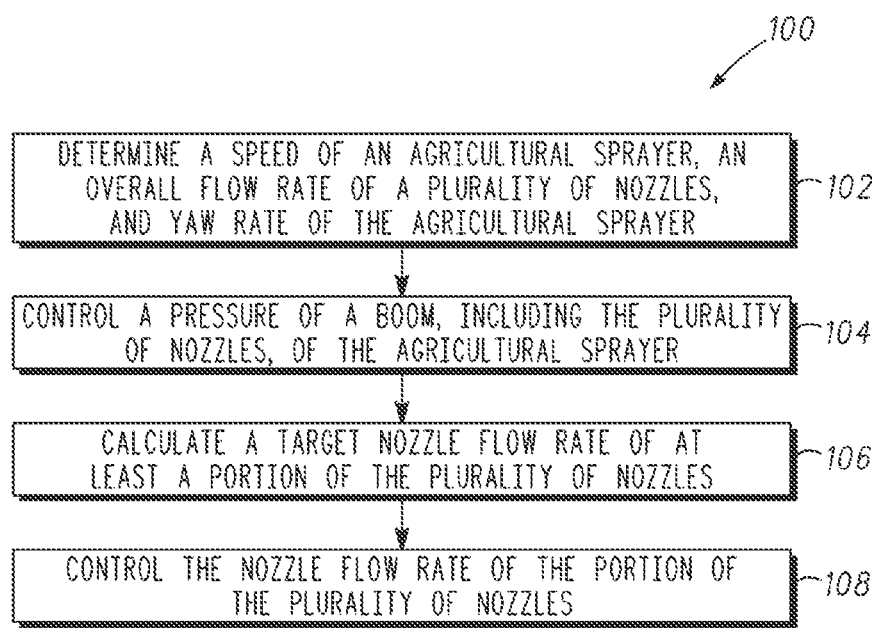
FIG. 8 is a block diagram showing one example of a method for controlling nozzle flow rate on an agricultural sprayer.

FIG. 8 is a block diagram showing one example of a method 100 for controlling nozzle flow rate on an agricultural sprayer having a boom with a plurality of nozzles. In describing the method 100, reference is made to features and elements previously described herein, although not numbered. At 102, the method 100 includes determining a speed of an agricultural sprayer, an overall flow rate of a plurality of nozzles, and yaw rate of the agricultural sprayer. In an example, the speed of the agricultural sprayer is determined by a GPS module, an accelerometer, a speedometer, tachometer, or the like. In an example, the overall flow rate of the plurality of nozzles is determined by a sum of the individual flow rates of each of the plurality of nozzles or is measured by a flow meter. In an example, the yaw rate is determined by a yaw sensor coupled to the boom, master node, or agricultural sprayer to detect a yaw of the hull and provide a yaw signal. At 104, a pressure of an agricultural product in a boom is controlled by a pressure valve in communication with the master node. At 106, the method 100 includes calculating, using at least one of the speed, the overall flow rate, and the yaw rate, a target nozzle flow rate of at least a portion of the plurality of nozzles. As described herein, at 108 the method 100 includes controlling the nozzle flow rate of the portion of the plurality of nozzles.

In an example, the method includes determining a boom section flow rate, including a portion of the plurality of nozzles, based on at least one of the speed, the overall flow rate, and the yaw rate and controlling the flow rate of the boom section. For example, the boom section corresponds to a nozzle group, as described herein, such as a plurality of nozzles controlled by a common ECU. As described herein, controlling includes controlling each of the nozzles of the plurality of nozzles to dispense the agricultural product at individual rates according to the location the one or more nozzles of the plurality of nozzles on a field map. Further, the current method 100 includes controlling the pressure of the boom is independent of controlling the nozzle flow rate of the portion of the plurality of nozzles.

Another example embodiment will now be described. In this embodiment, the master node handles a number of functions in the system. It communicates with the pump and a pressure sensor in order to regulate pressure in the system to a desired target pressure. It also communicates with a flow sensor to obtain an actual overall flow rate. The master node further receives vehicle speed data from a GPS system, yaw rate from a yaw sensor and a target volume/area of an agriculture product (typically input by a user).

The master node also provides error correction for the system by looping through each smart nozzle and calculating each smart nozzle's flow rate. The master node determines this flow rate based on vehicle speed, yaw rate, the location of the nozzle on the boom and the target volume per area. The master node then sums the flow rates and compares this sum to the actual overall system flow rate to determine an error percentage. The error percentage is then provided on the CAN bus for the smart nozzles to change their flow rate.

The master node also checks for saturation points in the flow range for the smart nozzles to make the percent error more accurate. For example, if the master node calculates a flow rate for a smart nozzle that exceeds the nozzle's maximum flow rate, then the master node uses the maximum nozzle flow rate rather than the calculated nozzle flow rate when summing the rates to determine an overall flow rate. The master node in this embodiment does not control the flow rates of the smart nozzles themselves.

Each smart nozzle independently calculates and controls its own flow rate based on CAN bus data from the master node. In an example, each nozzle performs its own flow rate calculation independent from the other nozzles. In particular, the master node transmits vehicle speed, yaw rate, boom width, location of each nozzle on the boom, target volume per area for the applied product, and the error correction. Using this data provided on the CAN bus, each smart nozzle determines its own flow rate, adjusted for the error correction determined by the master node.

The flow rate for a smart nozzle is obtained by multiplying various inputs together (e.g., speed, yaw rate, volume/area). The system (e.g., the master node) can also apply logic (such as if-then statements) to determine whether a smart nozzle should be on or off. For example, if there is an error or the master switch is off, the target rate may not be applied to the smart nozzle and the smart nozzle may be shut off.

NOTES AND EXAMPLES

Example 1 can include subject matter (such as an apparatus, a method, a means for performing acts, or a machine readable medium including instructions that, when performed by the machine, that can cause the machine to perform acts), such as a method of controlling nozzle flow rate of an agricultural product on an agricultural sprayer having a plurality of smart nozzles each associated with an electronic control unit (ECU) and one or more individual nozzles, comprising: determining a speed of the agricultural sprayer, an overall target flow rate of the plurality of smart nozzles, and a yaw rate of the agricultural sprayer; controlling a pressure of the agricultural product of the agricultural sprayer using a master node; determining a target nozzle flow rate for each smart nozzle using at least one of the speed, the overall target flow rate, and the yaw rate; and controlling with each respective smart nozzle, the nozzle flow rate of the associated one or more individual nozzles based on the target nozzle flow rate for the respective smart nozzle.

Example 2 can include, or can optionally be combined with the subject matter of Example 1 to optionally include wherein determining the target nozzle flow rate for each smart nozzle includes determining at each of the smart nozzles the target nozzle flow rate for the respective smart nozzle.

Example 3 can include, or can optionally be combined with the subject matter of one or any combination of Examples 1 or 2 to optionally include further comprising: calculating a boom section flow rate, the boom section including a portion of the plurality of smart nozzles, based on at least one of the speed, the overall target flow rate, and the yaw rate; and
controlling the boom section flow rate.

Example 4 can include, or can optionally be combined with the subject matter of one or any combination of Examples 1-3 to optionally include further comprising controlling the nozzle flow rate of each of the smart nozzles to dispense the agricultural product at individual rates according to the location of each of the smart nozzles or individual nozzles on a field map.

Example 5 can include, or can optionally be combined with the subject matter of one or any combination of Examples 1-4 to optionally include wherein controlling the pressure of the agricultural product is performed independent of controlling the target nozzle flow rate for each of the smart nozzles.

Example 6 can include, or can optionally be combined with the subject matter of one or any combination of Examples 1-5 to optionally include wherein controlling the nozzle flow rate includes determining an on/off state of one or more of the plurality of smart nozzles.

Example 7 can include, or can optionally be combined with the subject matter of one or any combination of Examples 1-6 to optionally include further comprising calculating an error with the master node, including: determining the nozzle flow rate of each of the smart nozzles based on the speed, the yaw rate, the location of the smart nozzle on the boom, and the target overall target flow rate of each of the smart nozzles; summing the nozzle flow rate of each of the smart nozzles; comparing the sum to an actual overall system flow rate to provide an error percentage; and providing the error percentage to each of the smart nozzles.

Example 8 can include subject matter (such as an apparatus, a method, a means for performing acts, or a machine readable medium including instructions that, when performed by the machine, that can cause the machine to perform acts), such as a system for controlling nozzle flow rate, comprising: an overall system pressure valve, configured to adjust the pressure of an agricultural product within a boom; a master node configured to receive an overall system flow rate measurement, an overall target flow rate, and an overall system pressure measurement, the master node configured to adjust the overall system pressure valve to control the pressure of the agricultural product; and a plurality of smart nozzles configured to dispense the agricultural product, the plurality of smart nozzles each associated with an electronic control unit (ECU) and one or more individual nozzle, the smart nozzle is configured to control a nozzle flow rate of the associated one or more individual nozzles Example 9 can include, or can optionally be combined with the subject matter of Example 8 to optionally include wherein each ECU is configured to receive at least one measurement of the agricultural sprayer from the master node including a speed of the boom, an overall system flow rate, and a yaw rate of the agricultural sprayer.

Example 10 can include, or can optionally be combined with the subject matter of one or any combination of Examples 8 or 9 to optionally include wherein each ECU is configured to calibrate a duty cycle curve of the respective smart nozzle based on an actual smart nozzle performance.

Example 11 can include, or can optionally be combined with the subject matter of one or any combination of Examples 8-10 to optionally include wherein each ECU is configured to adjust the smart nozzle flow rate of the agricultural product dispensed at each associated individual nozzle according to a difference between the overall target flow rate and the overall system flow rate measurement.

Example 12 can include, or can optionally be combined with the subject matter of one or any combination of Examples 8-11 to optionally include further comprising a master flow meter to provide the overall system flow rate measurement.

Example 13 can include, or can optionally be combined with the subject matter of one or any combination of Examples 8-12 to optionally include wherein the overall system flow rate measurement is determined at the master node as a sum of each smart nozzle.

Example 14 can include, or can optionally be combined with the subject matter of one or any combination of Examples 8-13 to optionally include further comprising a locating module including one or more location fiducials associated with the system, the one or more location fiducials configured to mark the location of one or more of the plurality smart nozzles on a field map.

Example 15 can include, or can optionally be combined with the subject matter of one or any combination of Examples 8-14 to optionally include wherein in the flow rate of the agricultural product dispensed from the plurality smart nozzles is controlled according to the one or more location fiducials.

Example 16 can include subject matter (such as an apparatus, a method, a means for performing acts, or a machine readable medium including instructions that, when performed by the machine, that can cause the machine to perform acts), such as a system for controlling nozzle flow rate of an agricultural product on an agricultural sprayer having a plurality of smart nozzles each associated with an electronic control unit (ECU) and one or more individual nozzles, comprising: an overall system pressure valve, configured to adjust the pressure of the agricultural product within the agricultural sprayer; and a master node configured to receive an overall system flow rate measurement and an overall system pressure measurement, the master node configured to adjust the overall system pressure valve to control the pressure of the agricultural product, wherein each of the plurality of smart nozzles is configured to dispense the agricultural product from the one or more associated individual nozzles at an individual rate based on nozzle characteristics of the one or more associated individual nozzles Example 17 can include, or can optionally be combined with the subject matter of Example 16 to optionally include wherein the nozzle characteristics vary with one or more of a smart nozzle or an individual nozzle position on a boom, length of the boom, an individual or smart nozzle spacing, yaw rate of the boom, target flow rate for the system, yaw rate of the agricultural sprayer, speed of the agricultural sprayer, the overall system pressure, agricultural product characteristics.

Example 18 can include, or can optionally be combined with the subject matter of one or any combination of Examples 16 or 17 to optionally include comprising one or more location fiducials associated with the system, the one or more location fiducials configured to mark the location of one or more smart nozzles of the plurality of smart nozzles on a field map.

Example 19 can include, or can optionally be combined with the subject matter of one or any combination of Examples 16-18 to optionally include wherein each of the smart nozzles is configured to dispense the agricultural product at individual rates according to the location the one or more smart nozzles of the plurality of nozzles on the field map.

Example 20 can include, or can optionally be combined with the subject matter of one or any combination of Examples 16-19 to optionally include wherein the ECU is configured to control a collective nozzle flow rate of the smart nozzles based on the nozzle characteristics of the associated nozzles.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A sprayer control system configured to control spray characteristics of spray nozzles, the sprayer control system comprising:
   a master node configured for coupling with one or more of a system pressure valve or a system pump, the master node is configured to:
      control the system pressure of a liquid agricultural product, and
      determine an error correction, the error correction based on the difference between an actual system flow rate and a sum of target flow rates; and a plurality of smart nozzles, each of the smart nozzles includes at least one control valve and an electronic control unit (ECU) in communication with the master node, the at least one control valve and the ECU are configured to control a component flow rate of liquid agricultural product through one or more spray nozzles, each smart nozzle is configured to:
    determine the target flow rate for the one or more spray nozzles with the ECU,
    determine a duty cycle for the one or more spray nozzles with the ECU, the duty cycle based on the target flow rate and the error correction, and
    operate the at least one control valve to deliver the liquid agricultural product to the one or spray nozzles according to the duty cycle.

2. The sprayer control system of claim 1, wherein the master node is configured to control the system pressure of the liquid agricultural product independently relative to the duty cycle of each smart nozzle of the plurality of smart nozzles.

3. The sprayer control system of claim 1, wherein the master node is configured to control a spray droplet size of the liquid agricultural product from the plurality of spray nozzles according to control of the system pressure.

4. The sprayer control system of claim 1, where each ECU of each smart nozzle of the plurality of smart nozzles determines the target flow rate and the duty cycle independent of other ECUs of the plurality of smart nozzles.

5. The sprayer control system of claim 1, wherein each ECU is configured to receive at least one value from the master node including a speed of a sprayer boom, a target system flow rate, a yaw rate of the sprayer boom, or a location of the smart nozzle along the sprayer boom.

6. The sprayer control system of claim 5, wherein the target system flow rate is in units of volume per unit area, and the target flow rate is in units of volume per unit time.

7. The sprayer control system of claim 1, wherein each ECU is configured to determine the duty cycle based on at least the determined target flow rate, the error correction and one or more of speed of a sprayer boom, target system flow rate, a yaw rate of the sprayer boom, or a location of the smart nozzle along the sprayer boom.

8. The sprayer control system of claim 1, further comprising a locating module including one or more location fiducials, the one or more location fiducials are configured to mark the location of one or more of the plurality of smart nozzles.

9. The sprayer control system of claim 8, wherein the duty cycle for the one or more spray nozzles is determined based on one or more of the location or speed of one or more of the plurality of smart nozzles.

10. The sprayer control system of claim 1 comprising one or more of:
    a master flow meter configured to measure the actual system flow rate,
    the system pressure valve,
    the system pump, or
    the one or more spray nozzles.

11. A method to control spray characteristics of spray nozzles in a sprayer system comprising:
    controlling the sprayer system with a master node:
        controlling a system pressure of a liquid agricultural product, the system pressure corresponds to a specified spray droplet size, and
        determining an error correction based on the difference between an actual system flow rate and a sum of target flow rates;
    controlling a plurality of duty cycles of a plurality of smart nozzles, controlling a duty cycle of the plurality of duty cycles for a smart nozzle of the plurality of smart nozzles includes:
        determining the target flow rate for one or more spray nozzles with an electronic control unit (ECU) of a smart nozzle of the plurality of smart nozzles,
        determining the duty cycle for the one or more spray nozzles with the ECU, the duty cycle based on the target flow rate and the error correction, and
        operating at least one control valve with the ECU to deliver the liquid agricultural product to the one or more spray nozzles according to the duty cycle.

12. The method of claim 11, wherein determining the duty cycle with the ECU includes determining the duty cycle with the ECU independently from controlling the system pressure with the master node.

13. The method of claim 11, wherein controlling the system pressure includes maintaining a static system pressure with the master node corresponding to the specified spray droplet size, and
    controlling the plurality of duty cycles includes changing the duty cycle while maintaining the static system pressure.

14. The method of claim 11 comprising controlling a spray droplet size to the specified spray droplet size according to the controlling of the system pressure.

15. The method of claim 11, wherein determining the duty cycle includes independently determining the duty cycle relative to other determined duty cycles of the plurality of duty cycles.

16. The method of claim 11, wherein determining the target flow rate includes determining the target flow rate with the ECU based on one or more of a speed of a sprayer boom, a system target flow rate, a yaw rate of the sprayer boom, or a location of the smart nozzle along the sprayer boom.

17. The method of claim 11, wherein determining the target flow rate includes determining the target flow rate with the ECU based on a location of the smart nozzle along the sprayer boom.

18. The method of claim 11, wherein each smart nozzle includes the ECU, at least one control valve, and one or more spray nozzles in communication with the at least one control valve.

* * * * *